Figures 1, 2:
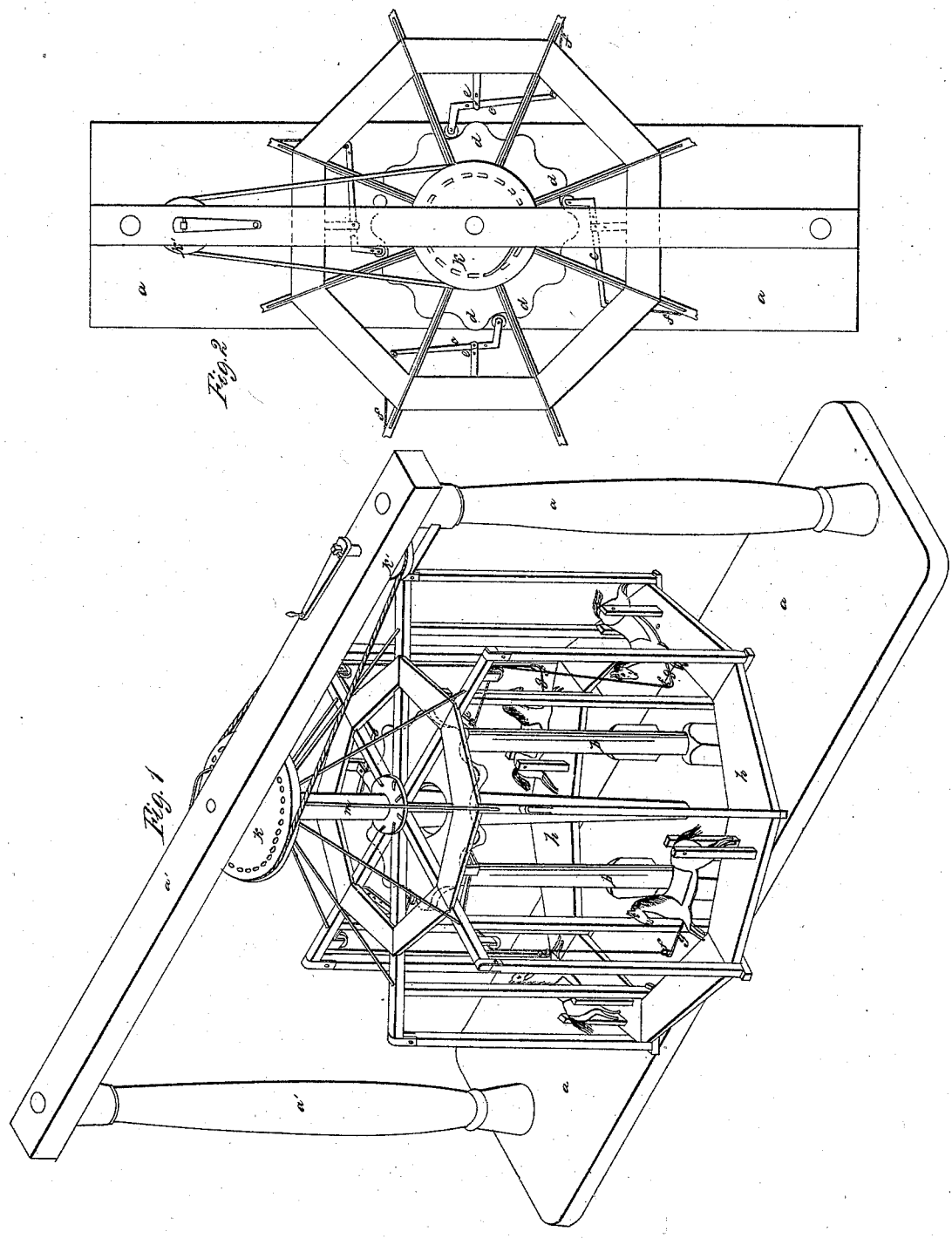

E. S. Scripture,
Roundabout,
No 7,419. Patented June 4, 1850.

UNITED STATES PATENT OFFICE.

ELIPHALET S. SCRIPTURE, OF GREENPOINT, NEW YORK.

FLYING-HORSE.

Specification of Letters Patent No. 7,419, dated June 4, 1850.

*To all whom it may concern:*

Be it known that I, ELIPHALET S. SCRIPTURE, of Greenpoint, in the county of Kings and State of New York, have invented a new and Improved Exercising-Machine, which I term Mechanical Galloping Horses; and I do hereby declare the following to be a full, clear, and exact description thereof, reference being had to the annexed drawings, making a part of this specification, in which—

Figure 1, is a perspective view from the side and, Fig. 2, is a ground plan of the machine.

The letters of reference in the drawings always represent the same part in each of the figures.

The nature of my invention consists in providing one or more mechanical horses, upon a revolving platform, and in the center erecting a series of cams around a center post—and by hanging the horses at a point near the trip upon a center, so as to admit of the head and forward part of the horse rising and falling, the before named center serving as a fulcrum. I then connect, by levers, the forward part of the horse, so that the levers will come in contact and be put in operation by a set or series of cams, each lever having a flexible connection to the horse and one after the other, in succession, to be acted upon as the platform revolves, and thus, by the rising and falling of the forward part of the horse produces an undulating motion very nearly resembilng the natural motion of a horse when galloping.

To enable others skilled in the art to make and us my invention, I will describe its construction and operation.

I provide a stationary foundation (*a*), having stationary uprights and a cross beam from one to the other as (*a'*). At the center of the foundation piece are several local posts (*b*) having at their top a plate with an undulating periphery or set of cones by which the several levers or arms for raising the horses are caused to act;—these levers are (*c*) and have frictionless rollers to roll against the cams as the levers are carried round the stationary cams (*d*). The levers act upon their fulcrums (*e*), and by the flexible connections (*f*) attach the upper part of the revolving frame work and platform to the forward part of the horse (*g*). I also provide a revolving platform (*h*) the same being braced so as to be sufficiently strong to sustain the platform with its horses and riders;—the whole of the revolving parts being attached to an upright shaft (*m*) to which motion is given by any well known means, as the pulleys (*k* and *k'*). If found necessary a pliable connection may be used to keep the horse from being raised too high, or thrown over, when driven at too great a speed. To prevent a backward movement being given to the whole I place a spring to act upon notches upon the side of the pulley (*k*).

In operation, the revolving platform is set in motion when the lever impinges against the cam and raises the forward part of the horse,—the weight of the horse and rider being sufficient to cause the whole to drop when the revolving parts come to the lower or depressed part of the cam, and thus is produced a rising and falling of the front part of the horse which closely resembles the motion of the gallop of the natural horse, the undulations or cams in succession, one after the other, keeping the forward part of the horse constantly rising and falling as it is revolving around the cams or undulating plate. Any number of horses may be placed upon the same platform and by its being revolved each will in succession come in contact with the cams, and receive a corresponding motion to the first, as before described.

I do not claim as my invention flying or revolving horses, as such have long been known and used; but What I do claim as my invention and desire to secure by Letters Patent of the United States, is—

The combination and arrangement of the undulated cams with the levers, and these with the flexible connections to the front part of the horse, for the purpose of, and by which I produce the rising and falling motion, which I term the galloping motion as hereinbefore described and represented.

ELIPHALET S. SCRIPTURE.

Witnesses:
   J. L. KINGSLEY,
   ABRAM LONGBOTTOM.